(12) United States Patent
Li

(10) Patent No.: US 6,470,740 B2
(45) Date of Patent: Oct. 29, 2002

(54) LOW SPEED WIND TUNNEL WITH ADJUSTABLE MOVING BOUNDARY

(75) Inventor: Yu-Chu Li, Hsinchu Hsian (TW)

(73) Assignee: Industrial Technology Research Institute, Hsinchu Hsian (TW)

( * ) Notice: Subject to any disclaimer, the term of this patent is extended or adjusted under 35 U.S.C. 154(b) by 0 days.

(21) Appl. No.: 09/749,761

(22) Filed: Dec. 28, 2000

(65) Prior Publication Data

US 2002/0083763 A1 Jul. 4, 2002

(51) Int. Cl.$^7$ .................................................. G01M 9/02
(52) U.S. Cl. .......................................................... 73/147
(58) Field of Search ........................... 73/147; 181/203, 181/217, 218, 219, 224, 226, 225, 229

Primary Examiner—Benjamin R. Fuller
Assistant Examiner—Corey D. Mack
(74) Attorney, Agent, or Firm—Rosenberg, Klein & Lee

(57) ABSTRACT

A low speed wind tunnel with an adjustable moving boundary is disclosed. The wind tunnel comprises a wind tunnel test section having at least one movable wall installed therein. The movable wall is capable of moving with the same direction and speed of the air flow. The movable wall may be a roller tread or a roller belt. A nested filter is installed at an inlet site of the air flow for regulating a source air flow into an evenly distributed flow field which is then sent to the wind tunnel test section. The nested filter includes a plurality of nested units arranged in order. Each nested unit has an air flow cross. section adjustable structure for varying the cross section area of the air flow passing through the wind tunnel test section, thereby adjusting the speed of the air flow. The movable wall may be designed to be an adaptive boundary for corresponding with different shapes of objects under test located in the wind tunnel test section.

27 Claims, 8 Drawing Sheets

LOW SPEED WIND TUNNEL WITH ADJUSTABLE MOVING BOUNDARY

BACKGROUND OF THE INVENTION

1. Field of the Invention

The present invention relates to a wind tunnel structure, especially to a low speed wind tunnel having a set of adjustable boundaries.

2. Description of the Prior Art

Normally, vehicles such as cars, airplanes, and boats before manufactured are applied several times of wind tunnel tests for guaranteeing that the final products are power conservative, low wind resistant, and speed oriented. Therefore, the wind tunnel test result has always been a critical factor affecting the quality of the vehicles. Moreover, the precision of the wind tunnel test data compared to the real quality of the final product is absolutely requested. It has been a long term effort to decrease the difference between the wind tunnel test data and the real quality data of the product.

In a traditional wind tunnel test, a layer flow structure with a constant volume flow rate has been used for a long time. Referring to FIG. 1, the traditional wind tunnel 100 has a wind tunnel test section 101 constructed by a plurality of static boundaries 102. An object under test 103 is positioned in the center portion of the wind tunnel test section 101. In this traditional static boundary structure, when an air flow A is filtered by honeycomb and guided into the wind tunnel test section 101, a uniformly distributed flow field in the front section 104 will be formed in the wind tunnel test section 101. A boundary layer 105 will be formed against the inner wall of the static boundary 102 and it will turn to be thicker along the downstream, i.e., the flow outlet of the wind tunnel. For maintaining the constant volume flow rate of the air flow, the flow speed near the central axis of the wind tunnel has to increase. Therefore, in the traditional wind tunnel, the flow field is hard to maintain its uniformity, which in turn causes a considerable test error during the wind tunnel test.

Although a nested filter 106 may be used before the air flow A entering the wind tunnel test section 101 for regulating the air flow A to be a uniformly distributed air flow, it is still difficult to obtain one kind of uniformly distributed air flow for all kinds of different speeds because the single kind of cross-sectional area of the filter 106 can not meet different kinds of flow fields. Therefore, the effect of the filter 106 may be suitable for a specific speed of air flow not for other speeds of air flows. It is therefore to provide a new structure for solving the above problems.

SUMMARY OF THE INVENTION

The primary purpose of the present invention is to provide a new wind tunnel having at least one movable boundary for promoting the test precision in order to overcome the test error problems confronted in the traditional wind tunnel test.

Another purpose of the present invention is to provide a new nested filter for obtaining a more uniformly distributed flow field in the wind tunnel test section with simplified structure yet high precision of test result.

Further another purpose of the present invention is to provide a new adjustable boundary structure installed inside the wind tunnel test section for compensating back the cross section area occupied by the test object according to the shape of the object under test.

According to one aspect of the present invention, there is provided a low speed wind tunnel having at least one moving boundary. The wind tunnel comprises a wind tunnel test section constructed by a plurality of walls allowing an air flow to pass from an air inlet to an air outlet thereof. At least a movable wall is installed inside the wind tunnel test section. A driving device is provided for driving each movable wall to move based on the direction and speed of the air flow.

DETAILED DESCRIPTION OF THE PREFERRED EMBODIMENTS

Figure 1:
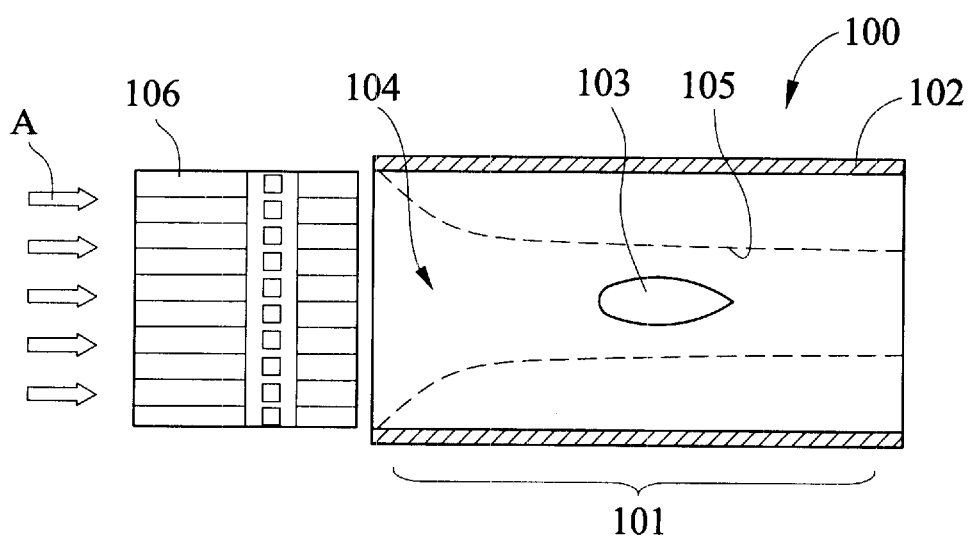
FIG. 1 is a traditional wind tunnel schematically showing that the air flow are formed in the static boundary of the wind tunnel test section.
Figure 2:
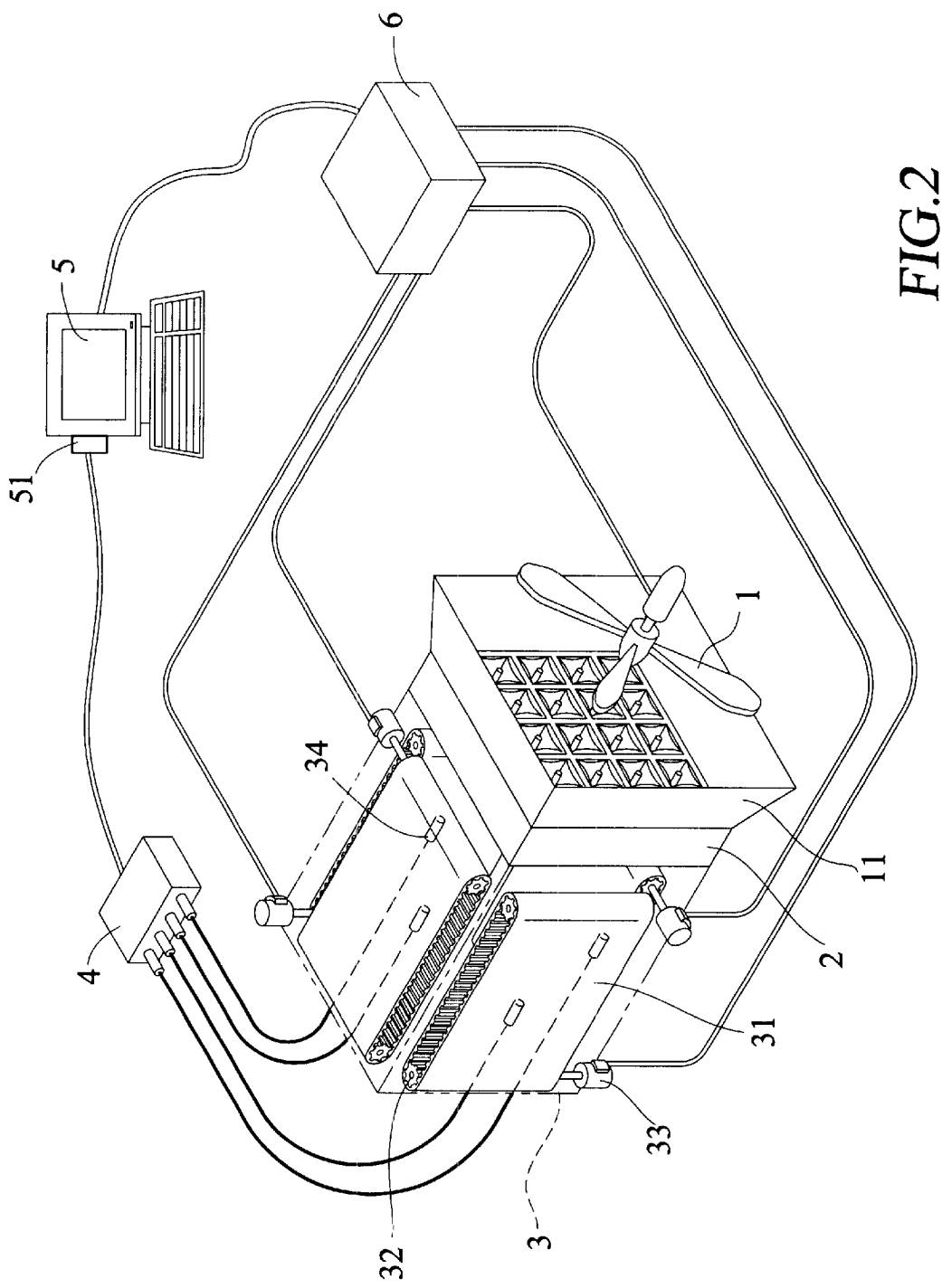
FIG. 2 is a perspective view of a low speed wind tunnel having a movable boundary in accordance with the present invention.

Referring to FIG. 2, a wind tunnel 3 having at least one movable and adjustable boundary in accordance with the present invention comprises a fan 1 for creating the wind flow whose volume flow rate may be changed by varying the speed of a driving motor which is further controlled by a feedback signal. The wind flow created by the fan 1 is guided by a wind mask 11 to a nested filter 2 for regulation. The nested filter 2 can uniformly distribute the flow field thereby obtaining a uniform flow field and then guide the constant speed flow into the wind tunnel test section. The averaged flow speed derived from all wind speed meters 34 should be feedback to adjust the output of fan 1.

The inner walls of the wind tunnel test section are designed to be movable. The movable inner walls may move along the flow direction I (see FIG. 7) and the moving speed may be adjusted according to the monitored speed in the wind tunnel test section and the averaged wind speed derived from each wind speed meter 34. In a first embodiment of the present invention, a movable wall 31 is provided which may be a roller tread or a roller tape having a plane extending along the direction of the air flow. The movable wall 31 is driven by corresponding rollers 32 and motors 33 (such as servo motors or step motors) associated with the movable wall 31. The moving speed of the movable wall 31 may be adjusted by the motors 33 according to the speed monitored by the speed sensor 30 in the wind tunnel section.

A plurality of wind speed meters 34 are located at different positions in the wind tunnel 3 for measuring all moving boundary speeds at these positions. The speed value measured by each speed meter 34 or each wind speed sensor 23 is sent to a speed/electronic-signal converter 4 via wires for converting the speed signal into an electronic signal which is further transferred to a computer 5 via a signal transmitting interface 51 such as a standard RS232/485 communication interface. For simplification, those wires from all wind speed sensors 23 connected to the converter 4 are omitted in FIG. 2. The computer 5 collects and processes all received data, and control the rotation speeds of the main fan 1, the cross-sectional opening of nested filter unit 21 and the motors 33 via an inverter 6, thus altogether forming a close-loop feedback control circuit for instantly monitoring the dynamic status of the wind tunnel test section and responding in accordance.

Figure 3:
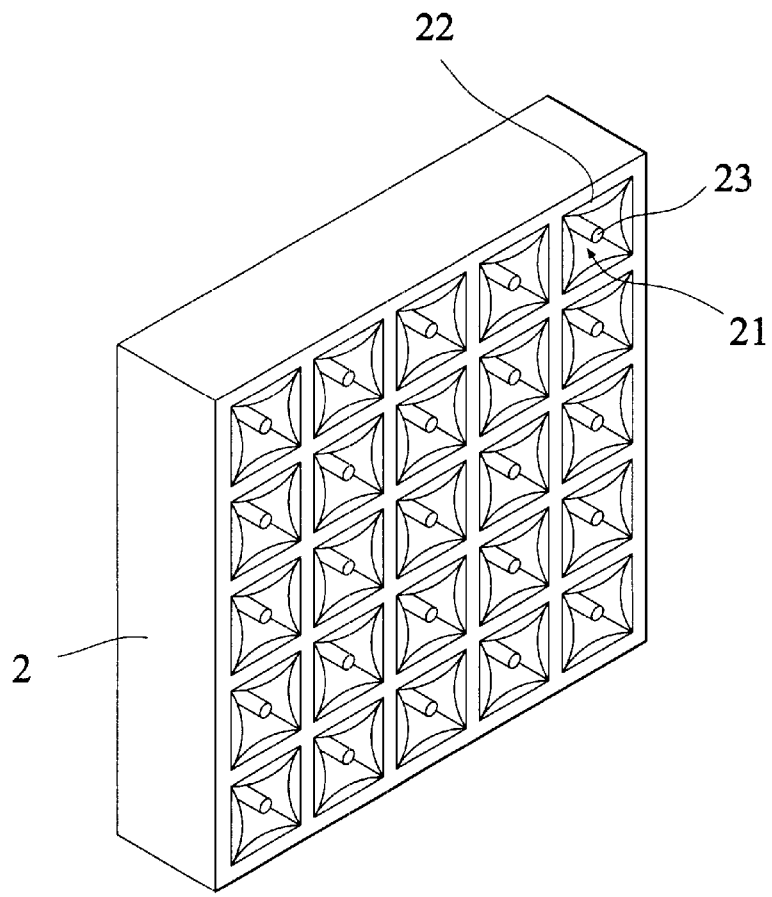
FIG. 3 is a perspective view of the filter structure used in FIG. 2 shown in more detail.

FIG. 3 is a detailed view of the nested filter 2 of FIG. 2. The nested filter 2 comprises a plurality of well arranged nest units 21 each of which has an adjustable flow cross section in an inner wall thereof. In the embodiment of FIG. 3, the adjustable flow cross section may be a flexible membrane or bellow 22 formed in the inner wall of each nested unit 21. The volume of the flexible membrane 22 may be controlled by a well known hydraulic or pneumatic driving device cooperating with a proportional valve and related pipes (not shown). With this structure, the cross section area for passing the air flow through each nested unit 21 may be varied. Additionally, a wind speed sensor 23 is installed in each nested unit 21 for detecting the wind speed value in each nested unit 21 and controlling the volume of each flexible membrane 22 for guaranteeing the best compensation to the passing air volume flow rate.

Figure 4:
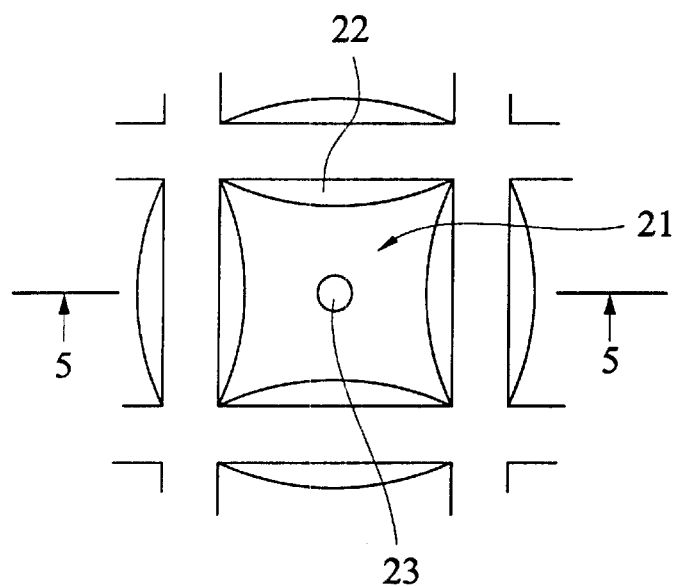
FIG. 4 is a front view of one of the nested units of FIG. 3.
Figure 5:
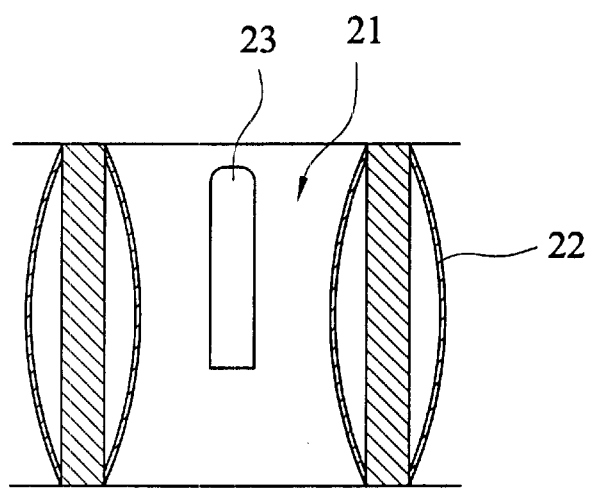
FIG. 5 is a cross-sectional view taken along line A—A of FIG. 4.

FIG. 4 is a schematic front view of the nested unit 21 and FIG. 5 is a cross-sectional view taken from the line A—A of FIG. 4. It can be appreciated from the drawings that when the volume of the flexible membrane 22 is increased, the cross section area for passing the air flow will be decreased. Similarly, when the volume of the flexible membrane 22 is decreased, the cross section area for passing the air flow will be increased. The wind speed data may be obtained by the wind speed sensor 23.

Figure 6:
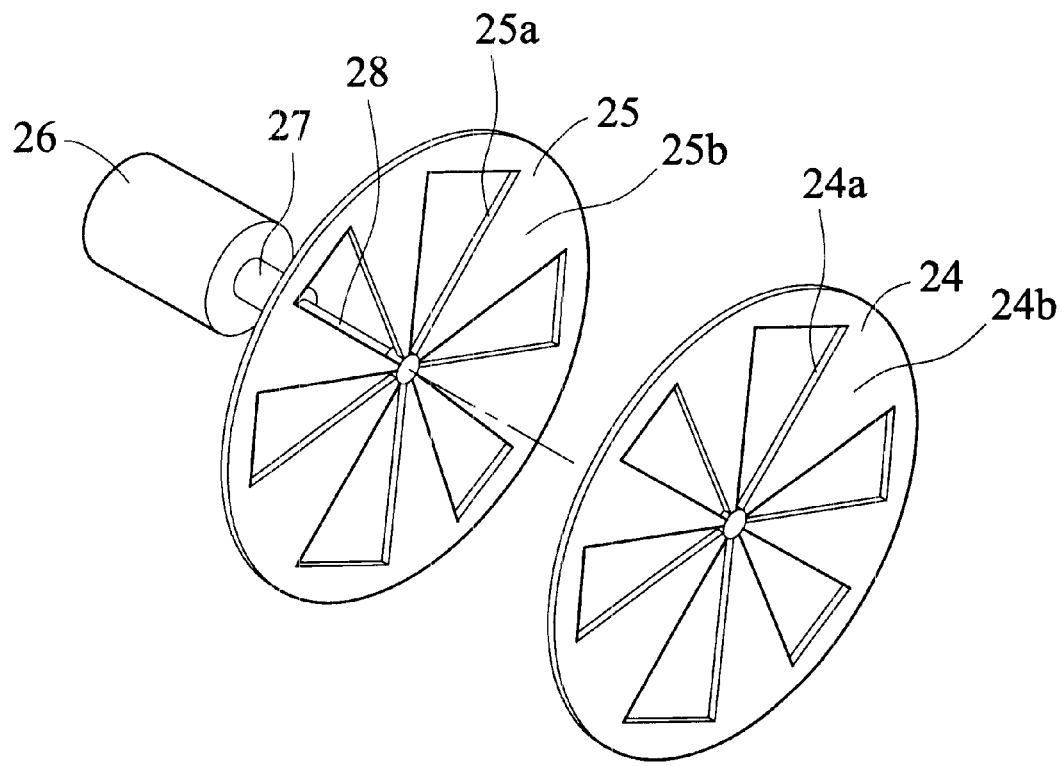
FIG. 6 is a perspective view of a second embodiment of the nested filter structure in accordance with the present invention.

FIG. 6 is a perspective view of an alternative embodiment of the nested unit 21 in the filter 2 in accordance with the present invention. In this embodiment, each nested unit 21 comprises a rotatable slotted plate 24, a non-rotatable slotted plate 25, a. step motor or servo motor 26, a decelerator 27, and a shaft 28. The rotatable slotted plate 24 is rotatably associated with the shaft 28 while the non-rotatable slotted plate 25 is fixed in the frame of filter 2 and connected to the shaft 28 by a bearing.

The rotatable slotted plate 24 and the non-rotatable slotted plate 25 both have a disk shape and each comprises a plurality of slots 24a, 25a and a solid region 24b, 25b. When the slots 24a of the rotatable slotted plate 24 are registered with the solid region 25b of the non-rotatable slotted plate 25, the air flow is fully blocked by the solid regions 24a, 25b of the rotatable slotted plate 24 and the non-rotatable slotted plate 25. The cross-sectional area for passing the air flow achieves to a maximum value when the slots 24a, 25a are exactly registered with each other. Therefore, the cross-sectional area for passing the air flow may be varied by adjusting the overlapped area between the slots 24a and 25a, which in turn adjusts the wind speed.

Figure 7:
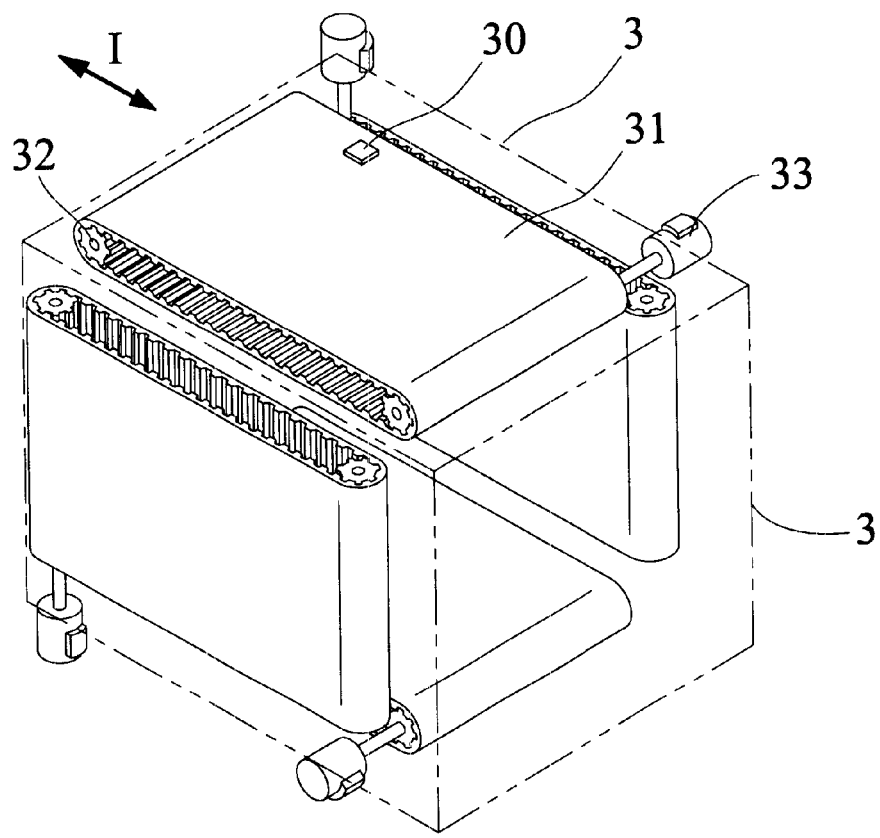
FIG. 7 is a schematic view of the movable boundary used in the present invention.

FIG. 7 is a schematic view for showing the movable walls 31 of the present invention. The removable walls 31 having a moving speed identical to that of the air flow are installed in the wind tunnel 3. Each movable wall 31 is constructed by a roller tread or roller tape which is driven by corresponding rollers 32 and servo motor 33. A speed detector 30 may be installed through contacting or non-contacting the surface of moving wall 31 for detecting the speed thereof. Specifically, the detected speed obtained by the movable wall speed meter 30 is compared with the detected wind speed obtained by the wind speed meter 34 of FIG. 2 and a difference value is resulted from the comparing. A PID control or a fuzzy control is applied for direct speed compensation. By utilizing the high precision feature of the servo motor or the step motor, the speed of the movable wall 31 may be adjusted to be identical to that of the air flow. With this condition, a filtered flow field having a relatively high space evenness may be achieved, and the axial pressure difference of the air flow field from the entrance to the exit in the wind tunnel may be almost zero. This represents that the space evenness along the axis of the air flow field may be maintained, and the air flow in the central area of the wind tunnel will not be accelerated. Moreover, the application of the PID control between the movable wall 31 and the wind speed meter 34 for speed compensation to the boundary layer will enable the test to be more precise than the conventional wind tunnel.

Figure 8:
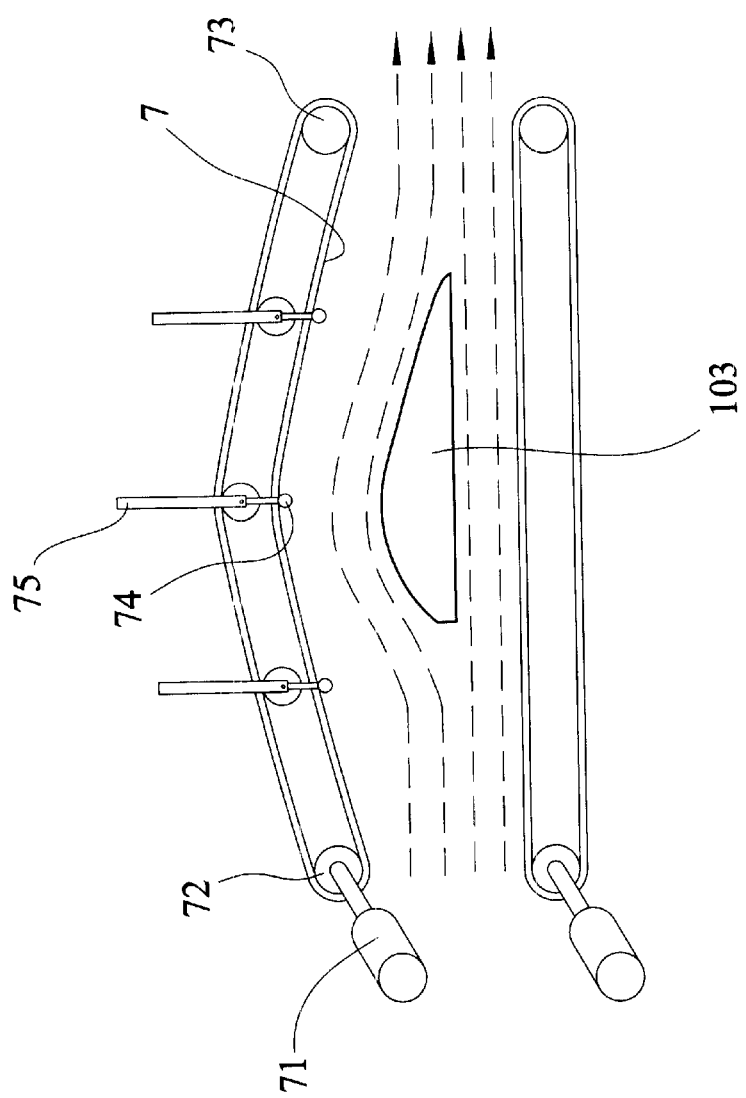
FIG. 8 is a schematic view showing the movable boundary of the invention may be further installed as an adaptive wall wind tunnel for different objects under test.

FIG. 8 is a schematic side view of the wind tunnel having an adaptive boundary wall 7 in accordance with the present invention. In a practical wind tunnel test, the object under test 103 will affect the cross-sectional area of the air flow due to the varied shapes and cross sections of the object under test 103. Therefore, in the embodiment of the present invention, the movable wall is further changed to be an adaptive boundary wall 7 for solving the problem caused by the various shapes of the objects under test 103 and achieving more precise test.

In the adaptive boundary wall 7, a plurality of rods 74 installed with support brackets 75 cooperate with rollers 72, 73 for positioning the wall in order to compensate back the cross section area above the top surface of the object under test 103. With this adjustable structure, the evenness of the air flow interfered by the top surface of the object under test 103 may be compensated. With the cooperation of the motor 71, the rollers 72, 73 and the rods 74, the adaptive boundary wall 7 above the object under test 103 may be resulted.

Figure 9:
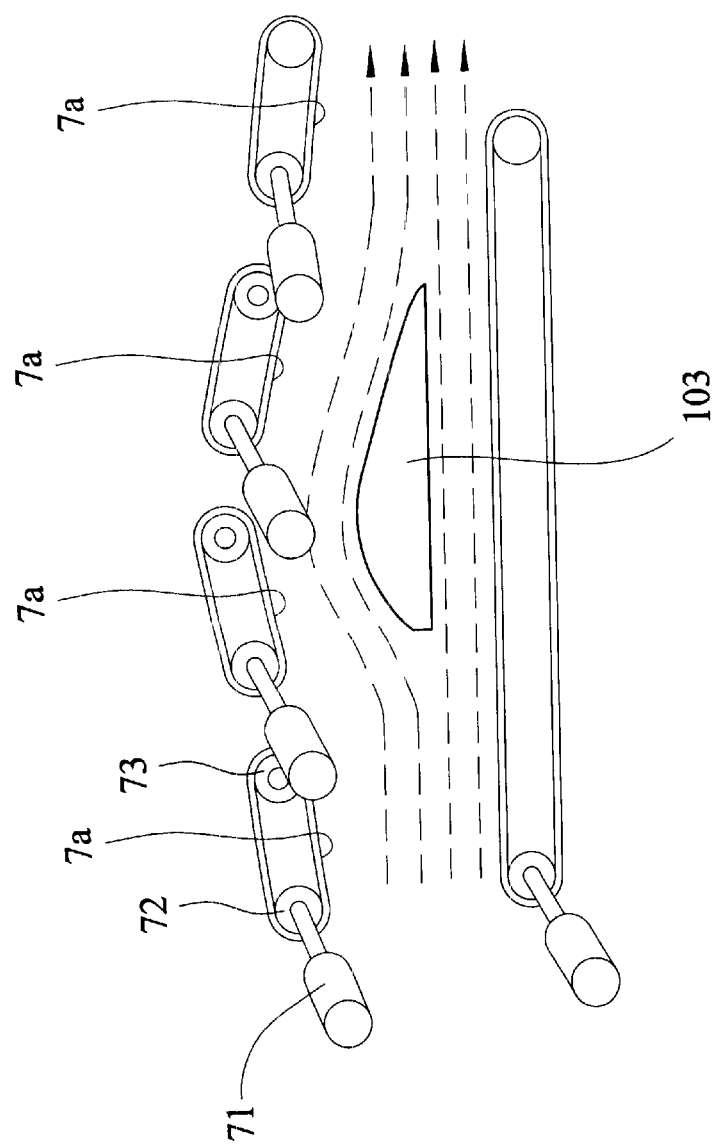
FIG. 9 is a schematic view showing the movable boundary of the invention may be installed as an adaptive wall wind tunnel having a number of movable boundaries in series for different objects under test in accordance with another embodiment of the present invention.

FIG. 9 is a schematic view showing the movable boundary of the invention may be further installed as an adaptive wall wind tunnel having a number of movable boundary sections 7a for different objects under test in accordance with another embodiment of the present invention. Each of the movable boundary section includes a motor 71, two rollers 72 and 73.

Although the operation of the rods 74 may cause a minor interference to the air flow field on the wall 7, the moving speed of the adaptive boundary wall 7 may compensate the interference. In this embodiment, each rod 74 is unrotatable and has a relatively small diameter for decreasing a relative line speed with respect to the air flow speed.

The above description about the adaptive boundary wall 7 is merely related to one embodiment for changing the air flow field. In practice, the number and altitude of each support bracket 75 may be adjusted by measuring and obtaining several positions of the wind pressure or field with reference to the shape of the object under test 103.

The embodiment of the present invention is only used for low speed wind tunnel test due to the speed limitation of bearings used by the rollers and the roller tapers. For use in the high speed wind tunnel test, the limited speed of the bearings have to be increased by using hydraulic bearings or super-conductive magnetic float bearings. Actually, the theory used in the present invention is not limited to the wind speed.

While the present inventions has been described with reference to the specific embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claimed is:

1. A low speed wind tunnel having at least one moving boundary, comprising:
   a fan driven to produce an air flow;
   a wind tunnel test section having an air inlet in fluid communication with the air flow from the fan, the wind tunnel test section being constructed by a plurality of walls defining a space through which the air flow passes in a longitudinal direction from the air inlet, at least one of the plurality of walls being a continuously displaceable movable wall; and
   at least one driving device coupled to the at least one continuously displaceable movable wall for driving the movable wall to move in a direction corresponding to the longitudinal direction and a speed of the air flow passing through the space of the wind tunnel test section.

2. The low speed wind tunnel having at least one moving boundary as claimed in claim 1, wherein the movable wall comprises a roller tread extending in the longitudinal direction of the air flow.

3. The low speed wind tunnel having at least one moving boundary as claimed in claim 1, wherein the movable wall comprises a roller belt forming a plane extending in the longitudinal direction of the air flow.

4. The low speed wind tunnel having at least one moving boundary as claimed in claim 1, wherein the driving device comprises:
   a driving motor; and
   a plurality of rollers associated with the movable wall and driven by the driving motor for driving the movable wall to move in the longitudinal direction of the air flow.

5. The low speed wind tunnel having at least one moving boundary as claimed in claim 4, wherein the driving motor is a servo motor.

6. The low speed wind tunnel having at least one moving boundary as claimed in claim 4, wherein the driving motor is a step motor.

7. The low speed wind tunnel having at least one moving boundary as claimed in claim 1, wherein the wind tunnel test section is installed with a plurality of wind speed meters for detecting the speed of the air flow.

8. The low speed wind tunnel having at least one moving boundary as claimed in claim 1, further comprising a nested filter positioned at the air flow inlet for converting a source air flow from the fan into a uniform distributed flow field which is then sent into the wind tunnel test section.

9. The low speed wind tunnel having at least one moving boundary as claimed in claim 8, wherein the nested filter comprises a wind mask.

10. The low speed wind tunnel having at least one moving boundary as claimed in claim 8, wherein the nested filter comprises a plurality of nested units arranged in order, and each nested unit has an air flow cross section adjusted structure.

11. The low speed wind tunnel having at least one moving boundary as claimed in claim 10, wherein each nested unit installed with a wind speed sensor for detecting the speed of the air flow.

12. The low speed wind tunnel having at least one moving boundary as claimed in claim 10, wherein the air flow cross section adjusted structure comprises at least one flexible membrane installed in an inner wall of the nested unit whose volume flow rate is varied for adjusting the cross section of air flow passing through the nested unit.

13. The low speed wind tunnel having at least one moving boundary as claimed in claim 10, wherein the air flow cross section adjusted structure comprises:
   a motor having a transmission shaft;
   a non-rotatable slotted plate having a plurality of slots defined in a disk;
   a rotatable slotted plate having a plurality of slots defined in a disk and
   associated with the transmission shaft for being driven to rotate;
   wherein the slots of the non-totatable slotted plate and the rotatable slotted plate are mutually overlapped with each other for controlling the cross section area of the air flow which enters the nested unit.

14. The low speed wind tunnel having at least one moving boundary as claimed in claim 1, wherein the movable wall is installed with a speed detector for detecting the moving speed of the movable wall.

15. A low speed wind tunnel having at least one moving boundary, comprising:
   a fan driven to produce an air flow;
   a wind tunnel test section having an air inlet in fluid communication with the air flow from the fan, the wind tunnel test section being constructed by a plurality of walls defining a space through which the air flow passes in a longitudinal direction from the air inlet, at least one of the plurality of walls being an adaptive continuously dispaceable movable boundary wall;
   a support structure for supporting the at least one adaptive continuously displaceable movable boundary wall in a contour compensating for a shape of an object under test positioned in the space within the wind tunnel test section; and
   at least one driving device coupled to the at least one adaptive continuously displaceable movable boundary wall for driving the boundary wall to move in a direction corresponding to a streamline passing around a test object and a speed of the air flow passing through the space of the wind tunnel test section.

16. The low speed wind tunnel having at least one moving boundary as claimed in claim 15, wherein the boundary wall comprises a roller tread extending in the direction of the streamline of the air flow.

17. The low speed wind tunnel having at least one moving boundary as claimed in claim 15, wherein the boundary wall comprises a roller belt extending in the direction of the streamline of the air flow.

18. The low speed wind tunnel having at least one moving boundary as claimed in claim 15, wherein the driving device comprises:
   a driving motor; and
   a plurality of rollers associated with the boundary wall and driven by the driving motor for driving the boundary wall to move in the direction of the streamline of the air flow.

19. The low speed wind tunnel having at least one moving boundary as claimed in claim 18, wherein the driving motor is a servo motor.

20. The low speed wind tunnel having at least one moving boundary as claimed in claim 18, wherein the driving motor is a step motor.

21. The low speed wind tunnel having at least one moving boundary as claimed in claim 15, wherein the wind tunnel test section is installed with a plurality of wind speed meters for detecting the speed of the air flow.

22. The low speed wind tunnel having at least one moving boundary as claimed in claim 15, further comprising a nested filter positioned at the air flow inlet for converting a source air flow from the fan into a uniform distrubuted flow field which is then sent into the wind tunnel test section.

23. The low speed wind tunnel having at least one moving boundary as claimed in claim 22 wherein the nested filter comprises a wind mask.

24. The low speed wind tunnel having at least one moving boundary as claimed in claim 22, wherein the nested filter comprises a plurality of nested units arranged in order, and each nested unit has an air flow cross section adjusted structure.

25. The low speed wind tunnel having at least one moving boundary as claimed in claim 24, wherein each nested unit installed with a wind speed sensor for detecting the speed of the air flow.

26. The low speed wind tunnel having at least one moving boundary as claimed in claim 24, wherein the air flow cross section adjusted structure comprises at least one flexible membrane installed in an inner wall of the nested unit whose volume flow rate is varied for adjusting the cross section of air flow passing through the nested unit.

27. The low speed wind tunnel having at least one moving boundary as claimed in claim 24, wherein the air flow cross section adjusted structure comprises:

a motor having a transmission shaft;

a non-rotatable slotted plate having a plurality of slots defined in a disk; and a rotatable slotted plate having a plurality of slots defined in a disk and associated with the transmission shaft for being driven to rotate;

wherein the slots of the non-rotatable slotted plate and the rotatable slotted plate are mutually overlapped with each other for controlling the cross section area of the air flow which enter the nested unit.

* * * * *